April 4, 1939.　　　J. R. OISHEI　　　2,153,522
WINDSHIELD WIPER ARM
Filed April 18, 1936
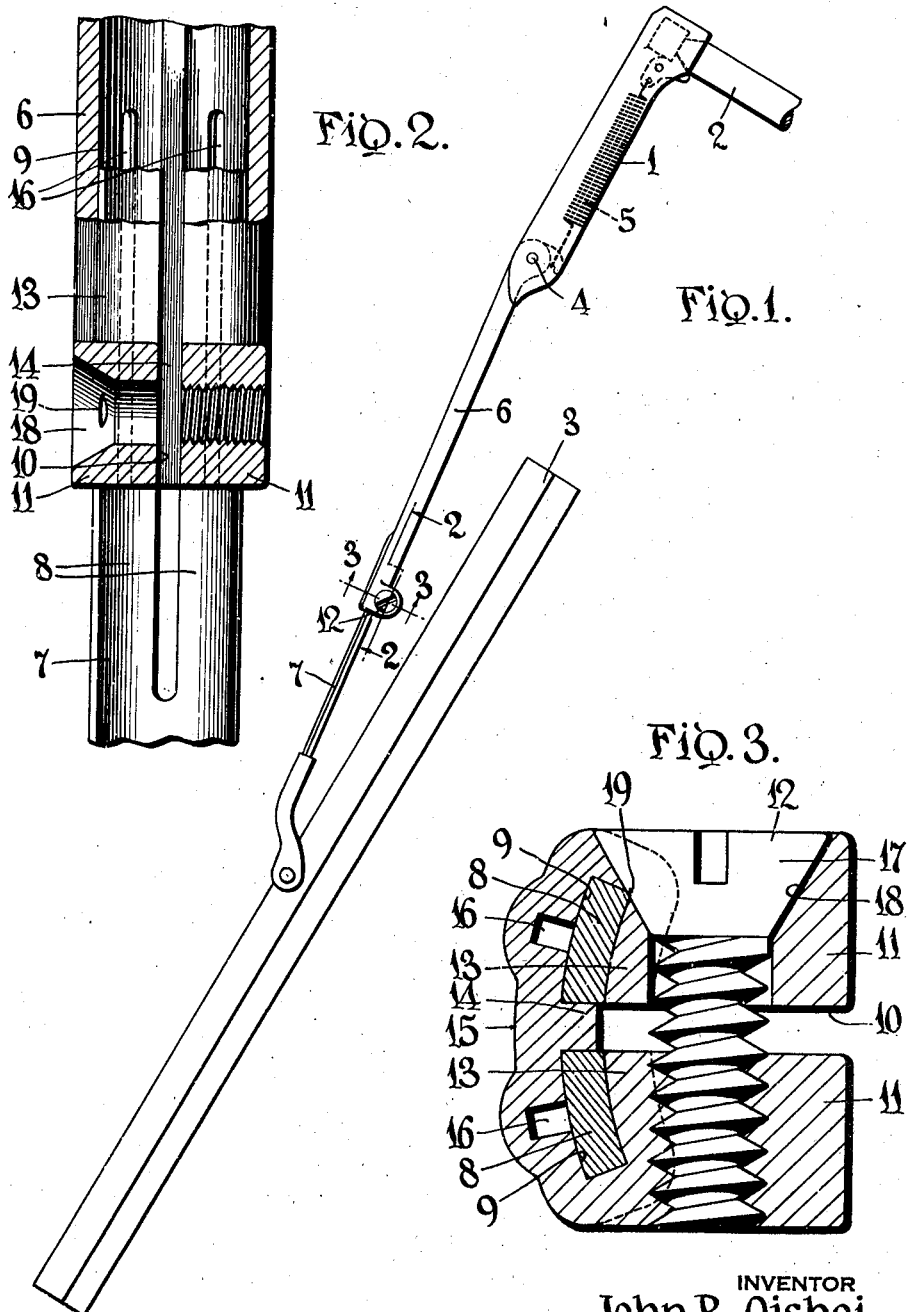
INVENTOR
John R. Oishei,
BY
Bean, Brooks, Buckley & Bean.
ATTORNEYS Patented Apr. 4, 1939

2,153,522

UNITED STATES PATENT OFFICE 2,153,522

WINDSHIELD WIPER ARM

John R. Oishei, Buffalo, N. Y., assignor to Trico Products Corporation, Buffalo, N. Y.

Application April 18, 1936, Serial No. 75,181

7 Claims. (Cl. 287—58)

This invention relates to a windshield cleaner and especially to the wiper actuating arm which is operated by a shaft and caused to reciprocate the wiper at the outer end of the arm.

The different makes of automobiles are equipped with windshields of varying heights, thus necessitating the use of arms of different lengths in order to clean that area of the windshield which is more suitable for the field of vision of the average person. This not only necessitates the manufacture of wiper arms of different lengths but if the motorist desires to change the location of the path of the wiper, he is compelled to replace the wiper arm with another of the preferred length.

It has heretofore been proposed to utilize a wiper arm which was adjustable as to length, but the design of the same has been such as to detract from the appearance of the motor vehicle and its construction such that it was difficult to maintain the adjustment in a practical manner.

The present invention has for its object to provide a practically designed wiper arm of novel construction by which the adjusted arm sections are secured firmly together and against becoming accidentally loosened during its reciprocation on the windshield.

The invention further resides in a construction by which a novel multi-frictional securement between the arm sections is obtained in a simple yet durable arrangement of parts.

The invention is disclosed in a preferred embodiment in the accompanying drawing wherein Fig. 1 is a side elevation of a windshield wiper arm disposed in its operative position for cleaning a windshield;

Fig. 2 is a fragmentary longitudinal sectional view about on line 2—2 of Fig. 1; and Fig. 3 is a transverse sectional view taken about on line 3—3 of Fig. 1.

Referring more particularly to the drawing, numeral 1 designates the inner section of the wiper carrying arm which is fixed to its actuating shaft 2 for being oscillated thereby to move the wiper 3 back and forth over the windshield glass. The wiper is carried by a spring pressed portion of the arm which is pivotally connected by a pivot 4 to the fixed inner section 1 and is urged by a spring 5 to press the wiper against the windshield with the desired pressure to secure a clean wiping contact.

The spring pressed pivoted portion of the arm comprises an intermediate section 6 and an outer blade carrying section 7, the latter section having its inner end bifurcated to form spaced and substantially parallel shank parts 8 which are telescopically received in spaced sockets 9 of the intermediate section 6. The outer end of the intermediate section, which receives the shank of the outer section 7, is formed with a resilient clamp having the jaws 11 divided by a slot 10 and adapted to be drawn together by a screw 12. By tightening the screw, the jaws 11 are drawn closer about the divided shank 8 to bind it at a given adjustment. This movement of the jaws produces a torque serving to angularly displace one socket 9 relative to this companion socket and thereby impart opposite twists to the shank parts for creating a binding action to secure the telescoped arm parts.

To enhance the value of such angular displacement of the sockets the slot 10 extends sufficiently deep to sever the inner walls 13 of the sockets from their dividing wall 14, thereby leaving such inner walls resilient and free of direct attachment to the dividing wall for increasing the resiliency of the jaws 11 and enabling the walls 13 to bear heavily on the shank parts for additional securement. Further binding action is developed by weakening the front wall 15 of each socket along a hinge line as defined by a longitudinal groove 16 whereby the inner resilient wall 13, together with that portion of the outer walls on the remote side of the groove 16, will flex as a unit from the hinge line. Consequently, a three point securement through a triple binding action results in practical means of firmly fixing a given adjustment.

As a further means of securing the adjustment, and in a different manner, the clamping screw 12 is provided with a tapered surface 17 adapted to fit in a seat 18 and engage, through an opening 19, the exposed edge of the adjacent shank part 8. Therefore, in addition to the binding pressure applied by the tightening of the jaws 11, a direct biting and mechanical interlock is made between the screw and the shank.

The desired length of the arm may readily be determined and the adjustment effectively secured by tightening the screw 12 to obtain the direct contact between the latter and the shank, as well as the triple binding action on the shank. By reason of the relative angular displacement of the portions 8, a longitudinal reinforcement of the shank will be provided to accommodate the pressure applied by the spring 1 to the wiping blade. The blade carrying section 7 may be coupled to the wiper 3 in a permanent manner, if desired, to thereby avoid the accidental loss of the wiper.

While the foregoing description has been given in detail, the inventive principles herein involved are capable of other physical embodiments and it is, therefore, not the intention to restrict the invention beyond the scope of the appended claims.

What is claimed is:

1. A wiper actuating arm for window cleaners comprising two longitudinally adjustable sections, one section having divided shank parts and the companion section having adjoining sockets for receiving the shank parts, and means for angularly displacing the sockets relative to each other to stiffen the divided portion of the arm and exert a binding force on the shank parts for securing a given adjustment.

2. A wiper actuating arm for window cleaners comprising two telescopic sections, one section having a bifurcated shank with substantially parallel shank parts, and the companion section having spaced sockets to receive the shank parts, and means carried by one section for applying a torque in the same to distort the shank parts and sockets into binding engagement, said means also having a mechanical interlock with said other section.

3. A wiper actuating arm for window cleaners comprising two telescopic sections, one section having spaced shank parts and the companion section having sockets slidably receiving the shank parts, said companion section having spaced clamping parts adjacent the sockets for being sprung toward one another to secure a binding engagement on the shank parts, and means for so springing said clamping parts.

4. A wiper actuating arm for window cleaners comprising two telescopic sections, one section having a bifurcated shank and the companion section having spaced sockets for receiving the shank parts, each socket having a resilient wall with an outwardly extending clamping part adapted to be sprung toward the other clamping part to angularly displace the shank parts relative to each other for exerting a binding pressure on the shank and also for stiffening the latter against bending transversely, and means for so springing said clamping parts.

5. A wiper actuating arm for window cleaners comprising two telescopic sections, one section having a bifurcated shank and the companion section having spaced sockets for receiving the shank parts, each socket having a resilient wall with an outwardly extending clamping part adapted to be sprung toward the other clamping part to angularly displace the shank parts relative to each other and secure a binding pressure on the shank, the opposite wall of each socket being weakened to form a hinge line for the resilient wall, and means for so springing said clamping parts.

6. An adjustable wiper actuating arm for window cleaners comprising two telescopic sections, one section having a shank adapted to be bent about a longitudinal axis and the companion section having a socket portion for receiving the shank, the socket having normally spaced relatively movable parts adapted to be sprung toward one another to exert a binding pressure on the shank, each part having a screw receiving opening with the shank being exposed through one opening, and screw means in the openings for springing said parts, said screw means having a part to directly engage said shank for additionally securing the arm sections in a given adjustment.

7. A wiper actuating arm comprising two sections, one section having a divided shank struck from sheet metal with the divided portions of the shank being received by the companion section, and means for subjecting each shank part to a torque, the torque in one shank part being opposite to the torque in the divided shank part whereby the sheet metal parts of the shank are angularly displaced with respect to each other for stiffening such sheet metal section.

JOHN R. OISHEI.